US006684081B2

(12) United States Patent
Sarkkinen et al.

(10) Patent No.: US 6,684,081 B2
(45) Date of Patent: Jan. 27, 2004

(54) METHOD AND SYSTEM FOR SEPARATING CONTROL INFORMATION AND USER DATA FROM MULTICAST AND BROADCAST SERVICES

(75) Inventors: Sinikka Sarkkinen, Kangasala (FI); Dimitris Koulakiotis, London (GB)

(73) Assignee: Nokia Corporation, Espoo (FI)

( * ) Notice: Subject to any disclaimer, the term of this patent is extended or adjusted under 35 U.S.C. 154(b) by 54 days.

(21) Appl. No.: 10/141,878

(22) Filed: May 10, 2002

(65) Prior Publication Data

US 2003/0211855 A1 Nov. 13, 2003

(51) Int. Cl.[7] ............................................... F25B 17/00
(52) U.S. Cl. ...................................................... 455/515
(58) Field of Search ............................. 455/434, 422.1, 455/515, 517, 524, 466; 370/469, 347, 350, 468; 709/310, 321, 327; 714/4, 5

(56) References Cited

U.S. PATENT DOCUMENTS

| | | | | |
|---|---|---|---|---|
| 6,167,248 A | * | 12/2000 | Hamalainen et al. | 455/403 |
| 6,198,936 B1 | * | 3/2001 | Yang et al. | 455/515 |
| 6,601,186 B1 | * | 7/2003 | Fox et al. | 714/4 |
| 2002/0006114 A1 | * | 1/2002 | Bjelland et al. | 370/248 |
| 2002/0089949 A1 | * | 7/2002 | Bjelland et al. | 370/331 |
| 2003/0040320 A1 | * | 2/2003 | Lucidarme et al. | 455/452 |
| 2003/0076799 A1 | * | 4/2003 | Kwak et al. | 370/335 |

\* cited by examiner

*Primary Examiner*—William Trost
*Assistant Examiner*—Danh C Le
(74) *Attorney, Agent, or Firm*—Antonelli, Terry, Stout & Kraus, LLP

(57) ABSTRACT

The invention is a system and method of transmitting control information and user data, relating to multicast or broadcast services, between a first information entity (110) within at least one mobile station (104) and a second information entity (114) within a controller (106) of a wireless network (102) in which the at least one mobile station is located. The process of the invention includes originating control information from at least one first information entity; encoding the control information at the at least one mobile station on a logical channel; transmitting the logical channel on a physical channel from the at least one mobile station to the controller; decoding the physical and the logical channels at the controller and providing the control information to the second information entity; providing user data at the second information entity; encoding the user data at the controller on a logical channel; encoding the logical channel, on which the user data is encoded, on a physical channel and wirelessly transmitting the physical channel on which the logical channel is encoded from the controller to the at least one mobile station; and decoding the physical channel and the logical channel on which the user data is encoded at the at least one mobile station and providing the user data to at least one of the first information service entities.

50 Claims, 6 Drawing Sheets

FIG. 4

METHOD AND SYSTEM FOR SEPARATING CONTROL INFORMATION AND USER DATA FROM MULTICAST AND BROADCAST SERVICES

BACKGROUND OF THE INVENTION

1. Field of the Invention

The present invention relates to the transmission of multicast and broadcast information between at least one mobile station and a controller of a wireless network.

2. Description of the Prior Art

Work to standardize multimedia broadcast multicast service (MBMS) as a new bearer to point to multipoint service has started in the third generation partnership project (3GPP). The aim of this work is to introduce new capabilities not only in Universal Terrestrial Radio Access Network (UTRAN) but also in the core network (CN) so as to provide point-to-multipoint services which use common network resources but which are intended to a restricted group of people (subscribers or users) in a cell. These requirements are not fully completed in the current cell broadcast concepts of 3GPP which is already standardized in 3GPP release 99 which is incorporated herein by reference in its entirety.

Even though standardization work in radio access network (RAN) working groups has not been fully started, some basic principles between RAN working groups and service architecture (SA) working groups have already been agreed. One such agreement includes that there is a no need for a retransmission functionality for multicast services which has been seen as not a feasible requirement from the UTRAN point of view. In practice, this means that the Radio Link Control layer (RLC) in UTRAN will support an unacknowledged mode (UM) or even transparent mode (TM) which does not require any previous information about the upper layer packet sizes which are used during the active multicast transmission of data through the air interface.

Another clear requirement from the UTRAN point of view is transmission of multicast related control and announcement information to and from the network to and from the mobile stations. In practice this means that, if transmission of control information is tied with the transmission of multicast data, i.e. through the same air physical channel, the multicast or broadcast concept used In UTRAN must be capable of separating the control information (i.e. control plane) and the multicast data (i.e. user plane) from each other. Due to the nature of multicast service transmission, when control information is sent to the air interface without knowledge regarding the current state of the authorized mobile stations, the control information (e.g. announcement frames) may have to be repeated without changing the content of the frame by changing the sequence number SN of the RLC Packet Data Unit (PDU). In this case, a comparison between an old and a new control frames cannot be made from the sequence number and therefore, something is required to recognize the reception of the already received control frames.

Broadcast and multicast transmissions are well-known. Broadcast transmissions are sent to mobile stations, whose identification and location are unknown as the result of, for example, no joining procedure having been completed. Multicast transmissions, on the other hand, are transmitted to only those subscribers that have previously indicated an interest in receiving the multicast services from the network, who can be identified after performance of the multicast joining procedure and/or whose location can be determined by tracking procedures.

In order to establish if subscribers or users, who control the mobile stations, are willing to receive a service providing a multicast or restricted broadcast transmission, two phases are executed. The first phase is the service registration phase during which subscribers or users, who possess the mobile stations, agree with the a service provider or operator, who controls the core network or the external network connected thereto, to receive the multicast or restricted broadcast services. The second phase is the multicast joining or subscription phase during which the subscribers or users, who possess the mobile stations, indicate a willingness to the service provider to receive the multicast or restricted broadcast services in order to obtain currently defined service configuration parameters of the multicast or restricted broadcast services. If the current service parameters have already been given to the mobile stations during the registration phase, the user of the mobile stations indicates a readiness to receive multicast or restricted broadcast services which enables the wireless network and the external network to make routing and resource management decisions which involve point to multipoint connections, such as a connection between the core network and the mobile stations regarding the offered service.

The most significant event of the above-described registration and multicast joining or subscription phase is the indication by the subscriber or user of the mobile stations of a willingness to receive an ordered multicast or restricted broadcast service from the service provider controlling the external network or network connected thereto. Subscription, which is required for the broadcast services (i.e. broadcast service, which are meant only to a restricted group of people), is always non-time critical (i.e. it can be made e.g. hours before the reception of the broadcast service, whereas the joining phase can be time critical (i.e., it is made just before the multicast transmission of the particular service is started) or a non-time critical transaction (i.e., the joining phase can be completed before the actual service activation). Depending on whether the joining transaction is a time-critical or a non-time critical transaction, services involving different subscriber service charges can be defined for the multicast or restricted broadcast service. This is a significant aspect of providing multicast or restricted broadcast services.

Currently, the 3GPP project has not specified a mechanism for separating multicast and broadcast related control plane (control information) from the user plane (user data).

SUMMARY OF THE INVENTION

The present invention provides a method and system which transmits control information and user data, relating to multicast or broadcast services, between a first information entity within at least one mobile station and a second information entity within a controller of a wireless network in which the at least one mobile station is located. The control information and user data is transmitted by using the same radio resources. Furthermore, the multicast and broadcast related control information and the user data may be transmitted during an active multicast or broadcast session. The mobile stations separate the already received control information from the first-time-received control information from each other. If the control information is such that it is repeated time after time, the mobile stations can decide to delete repeated packets at the RLC layer or whether to send the repeated packets to an upper layer. If the RLC sees that the packet is a duplicate of a previous one, the RLC layer can save the mobile station processing capacity and power by avoiding having to interpret the content of the packet.

Separation of the control information from the user data may be affected in any number of ways:

1. In one embodiment of the invention, the separation occurs at the RLC layer using two RLC entities and is made with two logical channels identified by corresponding values in Target Channel Type Field (TCTF) headers of data packets in the RLC layer. This embodiment does not require any changes to the existing PDU structure of the RLC and MAC layers in accordance with current standardization, such as 3GPP.
2. In a second embodiment of the invention the control information and the user data is also separated in the RLC layer using one RLC entity and two new logical channels. A length indicator is used in the header of the RLC layer to identify the type of logical channel to which the packets belong. No changes are required for the PDU structure in both the RLC and the MAC layers in accordance with current standardization such as 3GPP. This embodiment permits a RLC entity to send or generate control frames in an UM. In this way the same resources can be used for user and the control planes and now new RLC PDU structures or control devoted protocol layer is needed to identify.
3. In a third embodiment, a single logical channel is used between the MAC layer and a Multimedia Broadcast Multicast Center (MBMC) network layer. At the MAC layer, a TCTF field header identifies a type of logical channel to which the packet belongs. At the RLC layer, a length indicator header indicates the PDUs which contain control information. At the (MBMC) network layer, an indicator header identifies the type of control information contained in the packets (e.g. announcements).

A method of transmitting control information and user data, relating to multicast or broadcast services, between a first information entity within at least one mobile station and a second information service within a controller of a wireless network in which the at least one mobile station is located in accordance with the invention includes originating control information from at least one first information service entity; encoding the control information at the at least one mobile station on a logical channel; transmitting the logical channel on a physical channel from the at least one mobile station to the controller; decoding the physical and the logical channels at the controller and providing the control information to the second information entity; providing user data at the second information service entity; encoding the user data at the controller on a logical channel; encoding the logical channel, on which the user data is encoded, on a physical channel and wirelessly transmitting the physical channel on which the logical channel is encoded from the controller to the at least one mobile station; and decoding the physical channel and the logical channel on which the user data is encoded at the at least one mobile station and providing the user data to at least one of the first information entities. The multicast or broadcast services may be provided from another network to the second information entity; and the user data provided at the second information entity may be the multicast or broadcast services provided by the another network. The logical channel encoding the control information may be a first logical channel; and the logical channel encoding the user data may be a second logical channel. The logical channel on which the control information is encoded at the at least one mobile station and the logical channel which is decoded at the controller may be bi-directional. The at least one mobile station and the controller may have a protocol stack with a medium access control layer and radio link control layer with the medium access control layer including packets including a field identifying the logical channel on which the control information is encoded and the radio link control layer including packets including a field identifying a type of control information; and the fields may be used to process the control information and the user data. The at least one mobile station and the controller may have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields may be used to process the control information and the user data. A protocol stack with a medium access control layer and a radio link control layer may be coupled to the medium access control layer by the logical channels with the logical channel encoding the control information being bi-directional and the logical channel encoding the user data being unidirectional. The radio link control layer may comprise first and second radio link control entities which respectively process the control information and the user data. The radio link control layer may comprise a single radio link control entity which processes the control information and the user data. A protocol stack may be provided with a network control layer, a medium access control layer coupled to the network control layer by a single logical channel and a radio link control layer coupled to the medium access control layer by a single logical channel; and wherein the medium access control layer may use packets including a field identifying a type of logical channel containing the packets of the medium access control layer, the radio link control layer may use packets including a field identifying control packets within the single channel and the network control layer may use packets including a field identifying a type of control information in the identified control packets; and wherein the fields may be used to process the control information and the user data. A first radio resource control entity may be coupled to one of the first information entities and to a radio link control layer of the at least one mobile station, which receives the control information from either the first information entity or to the radio link control layer of the one the at least one mobile station entity; and a second radio resource control entity, may be coupled to the second information service entity and to a radio link control layer of the controller, which transmits the control information to either the second information entity or to the radio link control layer of the controller. The control information may comprise multicast joining messages or broadcast subscription messages. The control information may comprise announcements of multicast services or broadcast services to be offered. The control information may command the at least one mobile station to periodically repeat an announcement of multicast or broadcast services.

A system which transmits control information and user data in accordance with the invention includes a wireless network including mobile stations and a controller; a first information entity in each mobile station; and a second information service entity in the controller; and wherein at least one first information entity originates control information; the originated control information is encoded by at least one mobile station on a logical channel; the at least one mobile station transmits to the controller the logical channel encoded on a physical channel; the controller decodes the physical and logical channels and provides the control information to the second information entity; user data is provided at the second information entity; the user data is encoded at the controller on a logical channel; the logical channel on which the user data is encoded is encoded on a physical channel and wirelessly transmitted with the physical channel on which the logical channel is encoded from the controller to the at least one mobile station; and the at least one mobile station decodes the physical channel and the logical channel on which the user data is encoded and provides the user data to at least one of the first information service entities. The multicast or broadcast services may be provided from another network to the second information entity; and the user data provided at the second information entity may be the multicast or broadcast services provided by the another network. The logical channel encoding the control information may be a first logical channel; and the logical channel encoding the user data may be a second logical channel. The logical channel on which the control information is encoded at the at least one mobile station and the logical channel which is decoded at the controller may be bi-directional. The at least one mobile station and the controller may have a protocol stack with a medium access control layer and radio link control layer with the medium access control layer including packets including a field identifying the logical channel on which the control information is encoded and the radio link control layer including packets including a field identifying a type of control information; and the fields may be used to process the control information and the user data. The at least one mobile station and the controller may have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields may be used to process the control information and the user data. A protocol stack with a medium access control layer and a radio link control layer may be coupled to the medium access control layer by the logical channels with the logical channel encoding the control information being bi-directional and the logical channel encoding the user data being unidirectional. The radio link control layer may comprise first and second radio link control entities which respectively process the control information and the user data. The radio link control layer may comprise a single radio link control entity which processes the control information and the user data. A protocol stack may be provided with a network control layer, a medium access control layer coupled to the network control layer by a single logical channel and a radio link control layer coupled to the medium access control layer by a single logical channel; and wherein the medium access control layer may use packets including a field identifying a type of logical channel containing the packets of the medium access control layer, the radio link control layer may use packets including a field identifying control packets within the single channel and the network control layer may use packets including a field identifying a type of control information in the identified control packets; and wherein the fields may be used to process the control information and the user data. A first radio resource control entity may be coupled to one of the first information entities and to a radio link control layer of the at least one mobile station, which receives the control information from either the first information entity or to the radio link control layer of the one the at least one mobile station entity; and a second radio resource control entity, may be coupled to the second information service entity and to a radio link control layer of the controller, which transmits the control information to either the second information entity or to the radio link control layer of the controller. The control information may comprise multicast joining messages or broadcast subscription messages. The control information may comprise announcements of multicast services or broadcast services to be offered. The control information may command the at least one mobile station to periodically repeat an announcement of multicast or broadcast services.

BRIEF DESCRIPTION OF THE DRAWINGS

FIG. 4 illustrates the frame construction for the MAC, RLC and MBMC network layers of the second embodiment.

Like reference numerals identify like parts throughout the drawings.

DESCRIPTION OF THE PREFERRED EMBODIMENT

The present invention may be practiced in a wireless network of conventional construction in accordance with 3GPP specifications which includes a plurality of mobile stations and a radio network controller and a core network which provides multicast or broadcast services or a network connected thereto which provides multicast or broadcast services. Each of the plurality of mobile stations and the radio network controller, which may be part of a UTRAN network or a Global System for Mobile Communications (GSM)/Enhanced Data Rates for GSM Evaluation radio access network, uses a multiple layer protocol stack which includes a physical layer, a MAC layer, a RLC layer and a MBMC network layer containing first and second information entities which include the functions of originating control information and providing user data respectively.

The system and method of transmitting control information and user data in accordance with the invention transmits control information which is resident in a first MBMC of at least one of the mobile stations to a second MBMC resident in a controller of a wireless network and further transmits user data provided at the second MBMC to at least one of the first MBMC of the at least one mobile station. The control information and user data may be transmitted between the first MBMC of the mobile stations and the second MBMC of the controller using at least one logical channel above the MAC layer. In one embodiment, a pair of RLC entities are respectively used for the transmission of the control information and the user data respectively on different logical channels from the MAC layer through the pair of RLC entities. In a second embodiment, the transmission of control information and user data on a pair of logical channels is made from the MAC layer through a single RLC entity. In the third embodiment, a single logical channel is used to transmit control information and user data from the MAC layer through a single RLC layer to the MBMC layer. The logical channels used for transmitting the control information may be bidirectional.

Figure 1:
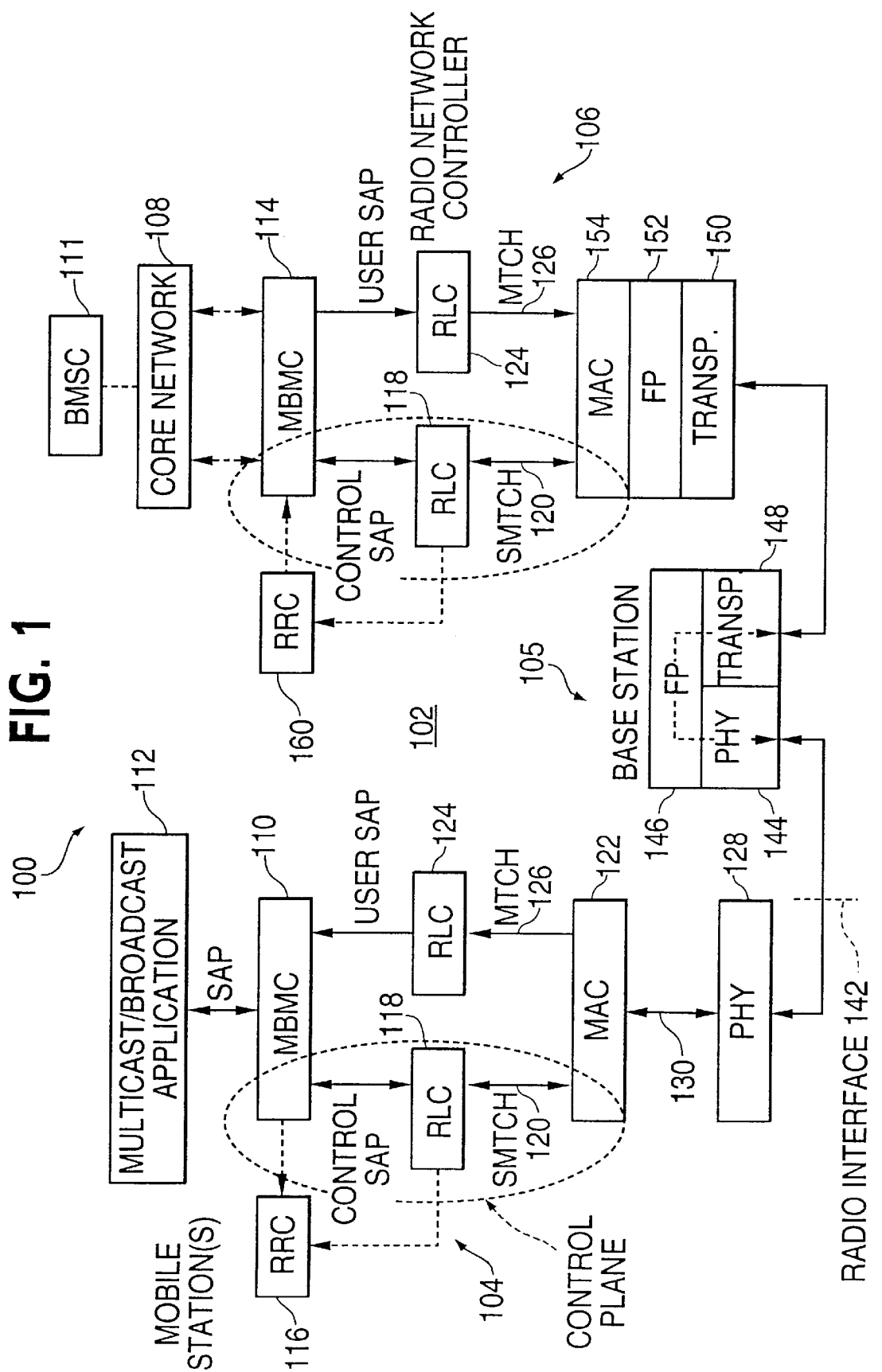
FIG. 1 illustrates a first embodiment of the present invention which provides separation of control information and user data by using separate RLC entities and logical channels.

FIG. 1 illustrates a first embodiment 100 which is comprised of a wireless network 102 containing a plurality of mobile stations 104 (only one is illustrated), a plurality of base stations 105 (only one is illustrated), and a radio network controller 106. The radio network controller 106 is connected to another network 108 which may be a core network in accordance with the 3GPP specifications. The core network 108 may be a source of multicast service transmissions or broadcast service transmissions to the plurality of mobile stations 104. However, the core network 108 may also be an intermediate domain between the radio access network 102 and the source of multicast or broadcast services (not illustrated) to be provided to the plurality of mobile stations 104. The core network 108 is connected to a Broadcast Multicast Service Center (BMSC) 111 which is a controller for the providing of the multicast or broadcast services by the core network to the mobile stations 104. The dotted line connections between the core network 108 and the MBMC 111 may be a Iu signalling connection and a connection using the General Packet Radio System (GPRS) tunneling protocol.

Each of the mobile stations 104 and the radio network controller 106 contains a number of entities on the first, second and third layers of the protocol stack in accordance with the 3GPP specifications. A first MBMC 110 is located in each of the mobile stations 104 and a second MBMC is located in the radio network. The first MBMC 110 originates control information and is a first information entity. The second MBMC 114 provides user data, which is originated from the core network 108 or the network connected thereto, and is a second information entity.

A first function provided by the MBMC protocol is a "generation of MBMC scheduling messages". The MBMC 114 receives scheduling (control plane) information together with each MBMC (user plane) message over the interface employed between the BMSC 111 and the radio network controller 106. Based on this scheduling information, the MBMC 114 generates at the UTRAN side schedule messages, and schedules MBMC message sequences accordingly. At the mobile station side, the MBMC 110 evaluates the scheduled messages and indicates scheduling parameters to the RRC 116. These parameters are then used by RRC 116 to configure the lower layers for discontinuous receptions of MBMC messages.

A multicast or broadcast multimedia service may consist of several sessions which shall be sent together. One combined multicast session can contain for example sports video clips and second news. This requires a scheduling between the different multicast sessions, which is taken care of by a second function provided by the MBMC 114 called "scheduling of MBMC sessions". The transmission and evaluation of messages and scheduling information is carried out as by the function "scheduling of MBMC messages".

There are basically two possible ways to implement scheduling between sessions, which are explained based on an example for a multicast service. In this example, the multicast service comprises a sports video clips session and a news session. The sports video clips session consists of five parts 1v, 2v, 3v, 4v and 5v, and the news session consists of two parts 6n and 7n. In a first alternative, each multicast session is scheduled independently and sequentially (serially). This means that for example multicast sessions which contain video are scheduled first and after that multicast sessions which contain news follow. In this case, parts 1v, 2v, 3v, 4v and 5v are sent first, and parts 6n and 7n are only sent after all parts of the video clips session have been transmitted.

In a second alternative, the multicast sessions are scheduled simultaneously. In this case, part of the news and sports clips sessions could be sent for instance in the following order: 1v, 6n, 2v, 7n, 3v, 4v and 5v.

Another function provided by the MBMC protocol is "scheduling of MBMC service modes". A scheduling decision between the different service modes, i.e. multimedia multicast or multimedia broadcast, has to be carried out in both, the BMSC 111 and the MBMC 114. The decisions are transmitted through the employed interface between the BMSC 111 and the radio network controller 106. The BMSC 111 is responsible for knowing how many MBMC sessions are currently going on at the UTRAN side. The required service mode scheduling on the MBMC 114 should be based on given priorities for the sessions (corresponding to different modes), indicated by the BMSC 111 in each BMSC data frame. In the MBMC 114 a session with a higher priority should always be ahead of data with a lower priority. The scheduling decision between the service modes which have the same priority should be based on the arrival of data from the BMSC 111. How complex the scheduling algorithm for different service modes has to be is also dependent on the selected resource allocation and the channel structure for the multicastlbroadcast and MBMC data services.

The data for both services that can be provided by the BMSC 111 to the radio network controller 106, i.e. multicast and broadcast, are transmitted by the MBMC 114 via the RLC layer and the MAC layer to the physical layer. The two modes of MBMC operation require a prioritization due to the different nature of charging and applications that run over them. Therefore, a further function provided by the MBMC 114 is a "prioritization between MBMC multicast mode messages and MBMC broadcast mode messages".

In addition, the BMSC 111 layer and the L2/MBMC 114 sublayer require a function that co-ordinates the two different enabled services, in particular for scheduling and prioritizing MBMC and BMSC messages in a harmonized way. Thus, an interaction is needed with the BMSC 111 on how data is forwarded to the RLC layer, etc. A corresponding function "scheduling/prioritization between MBMC and message" is equally provided by the MBMC protocol.

Moreover, the MBMC 114 provides a function "storage of MBMC messages" for storing MBMC messages. This function takes care more specifically of storing MBMC messages received over the interface employed between the BMSC 111 and the radio network controller 106 until a scheduled transmission.

With the aid of yet another function "data discard", the MBMC 114 can discard such multicast related data, which has been considered to be invalid.

An additional function "traffic volume monitoring and radio resource request for MBMC" is provided by the MBMC 114 for periodically predicting the expected amount of MBMC traffic volume in kilo bits per second that is currently needed for the transmission of MBMC messages. The function further indicates the expected amount of MBMC traffic to the RRC 160. Thus, this MBMC function determines at the UTRAN side the required transmission rate for a multicast or broadcast multimedia service based on the messages received over the interface employed between the BMSC 111 and the radio network controller 106. Based on this calculation, the function then requests an appropriate logical channel and transport channel resources from the RRC 160. Transport channels that could be used are DSCH (Downlink Shared Channel) and/or FACH (Forward Access Channel) and/or the HS-DSCH (High Speed-Downlink Shared Channel) of HSDPA (High Speed Downlink Packet Access). Any suitable algorithm which is adapted to the respectively employed algorithm for transmitting MBMC messages can be implemented for predicting the amount of MBMC traffic. The algorithm can also include the option that some parameters used in the prediction can be set or changed by the operator of the network.

A further function provided by the MBMC 114 is for the "transmission of MBMC messages to mobile stations". This function transmits the MBMC messages, i.e. equally scheduling and multicast or broadcast multimedia messages, to the user equipment according to a determined schedule. The transmission follows again the protocol stack, thus the transmission takes place first from the MBMC 114 to the RLC layer, then to the MAC layer and finally to the physical layer.

A "charging information support" function interacts with the RLC function, in case the RLC function operates in acknowledgement mode, in order to enable a charging based on the amount of data transmitted to a user equipment. This function is used to this end for collecting mobile station information regarding the amount of data, i.e. packets, received by a mobile station, based on the amount of acknowledged PDUs. The collected information can then be sent via the interface employed between the radio network controller 106 and the BMSC 111 to the core network 108. The collected information can be transmitted in particular to a corresponding MBMC charging entity in the core network 108, which charges the user according to the received data.

For MBMC data transmissions supporting a MBMC PDU repetition, a further function called "retransmission/ repetition" provided by the MBMC 114 performs the retransmission of data. This means that for instance, no RLC level retransmission is introduced and that the UM RLC mode is used.

The MBMC 114 also performs header compression of MBMC PDUs. Moreover, the L2/MBMC sublayer must be aware of multicast related groups on that level to submit multicast data to the correct cells under one radio network controller 106. This is taken care of by a "multicast group handling" function provided by the MBMC 114.

Finally, a function is provided by the MBMC 114 for identifying MBMC sessions and for initializing links between the BMSC 111 and the MBMC protocol sublayer L2/MBMC of the radio network controller 106. This function is called 'identification of MBMC session and initialization of link between BMSC and L2/MBMC". Once the BMSC 111 has received content from the core network 108, a message has to be sent to the L2/MBMC sublayer via the interface between the BMSC and the radio network controller 106 in order to initiate the session and to provide the session details.

On the side of the mobile stations 104, the MBMC 110 enables the mobile stations to handle multicast/broadcast multimedia services. The MBMC 110 of the mobile stations 104 comprises a function "delivery of MBMC messages to upper layer (NAS)". This functions delivers the multicast or broadcast multimedia messages received from the core network 108 via the interface provided between the BMSC 111 and the radio network controller 106 to upper layers (NAS) in the respective mobile stations. Only non-corrupted MBMC messages are delivered.

A multicast/broadcast application 112 is coupled to the MBMC 110. The multicast/broadcast application 112 is a program which may perform any one of or more than one of the functions of processing the multicast/broadcast data received from the MBMC 114, providing decryption thereof, generating signalling to be sent to the wireless network 102 and/or the core network 108 or the network connected thereto or generating acknowledgements for transmission to the service provider of the multicast or broadcast services indicating reception of the multicast/broadcast data. The multicast/broadcast application 112 uses the service of MBMC 110 and provides the services to an end user i.e. subscriber or users of the mobile stations 104.

Each of the plurality of mobile stations 104 contains a radio resource controller (RRC) 116 which receives control information from a RLC entity 118 located in a first logical channel 120 in which control information is transmitted between the first MBMC 110 and the MAC layer 122. The RRC 116 and the corresponding RRC 160 are known and are defined in accordance with the 3GPP specifications which specifications pertaining to an RRC are incorporated herein by reference in their entirety. The logical channel 120 is known as the "signaling multicast traffic channel" (SMTCH) and is located between the RLC entity 118 and the MAC layer 122. The MAC layer 122 is coupled to the RLC layer 124 by a second logical channel 126 which is identified between the MAC layer 122 and the UM RLC layer 124 and is known as "the Multicast Traffic Channel" (MTCH). The RLC entities 118 and 124 may operate in UM, acknowledgment mode and transparent mode as defined in the 3GPP specifications. The first logical channel 120 is bidirectional and the second logical channel 126 is unidirectional which transmits user data to the first MBMC 110. The RLC 118 also may receive user data from the first MBMC 110. The physical layer 128 is coupled to the MAC layer 122 by a bidirectional channel 130 which may be a Forward Access Channel (FACH) in accordance with the 3GPP specifications or a new channel or a Random Access Channel (RACH) in accordance with the 3GPP specifications or a new transport channel.

Base station(s) 105 is connected to the plurality of mobile stations 104 by a radio interface 142 which, in the uplink, may be the Physical Random Access Channel (PRACH) in accordance with the 3GPP specifications and in the downlink may be the secondary common control physical channel (SCCPCH) in accordance with the 3GPP specifications. The base station 105 includes a physical layer 144, a Frame Protocol Layer (FP) 146, and a transport layer 148.

The radio network controller 106 contains a transport layer 150, a FP layer 152 and a MAC layer 154. The first and second logical channels 120 and 126 respectively connect the MAC layer 154 to RLC entities 118 and 124, respectively. The RLC 118 and RLC 124 of the radio network controller 106 perform the same functions as in the mobile stations 104. The RRC 160 may transmit control information to the MBMC 118 or the RLC 124.

Figure 2:
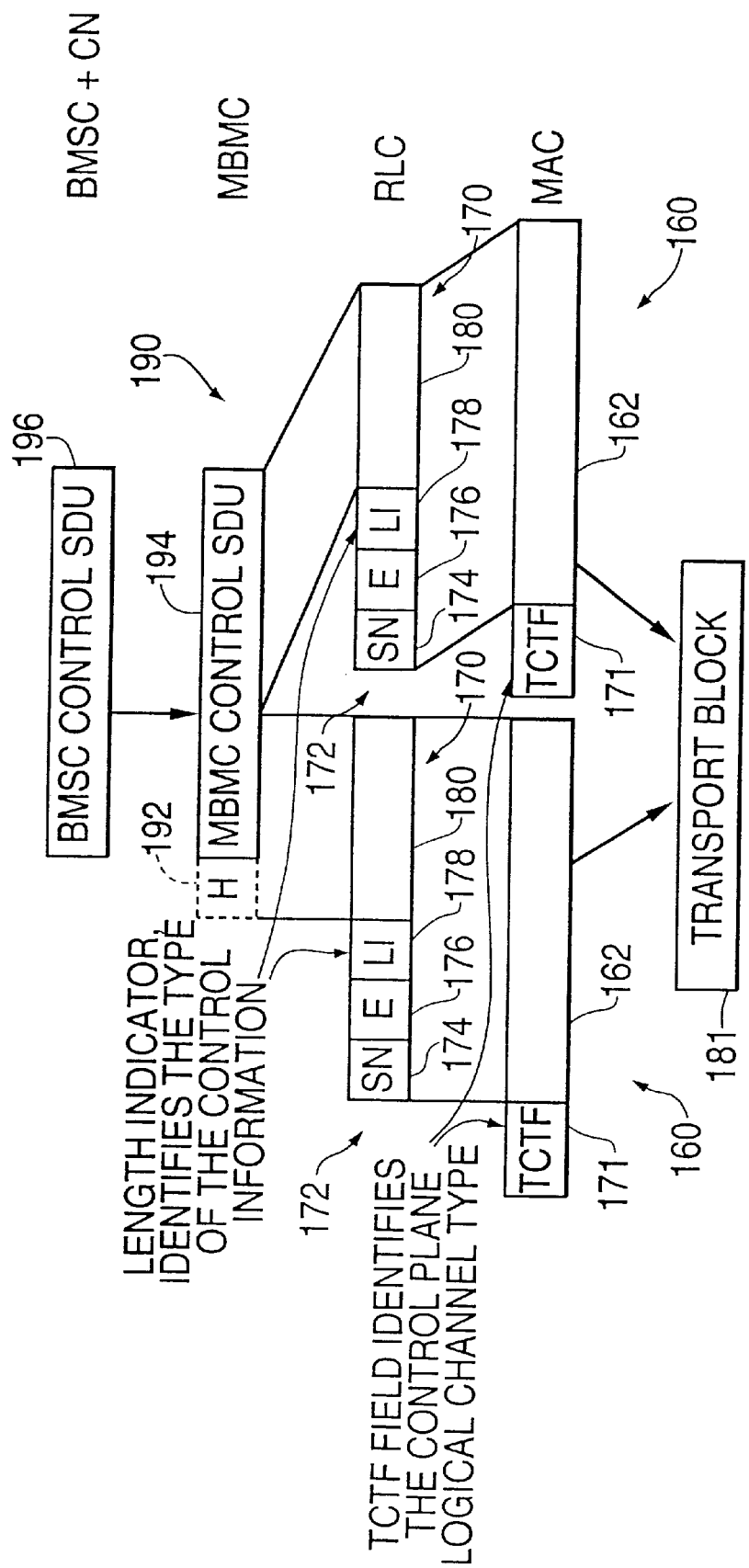
FIG. 2 illustrates the frame construction for the MAC, RLC and MBMC network layers of the first embodiment.

FIG. 2 illustrates the frame construction for the MAC, RLC and MBMC layers of the first embodiment of the protocol stack. At the MAC layer, a pair of data frames 160 are illustrated which each contain a data field 162 and a TCTF field header 171 which identifies that the frame is contained in a logical channel type, such as the SMTCH channel 120. The data frames 160 are forwarded as a transport block 181 from the MAC layer to a lower layer which is the physical layer 128 at the mobile stations and the FP layer 152 at the radio network controller 106. At the RLC layer, a pair of data frames 170 are illustrated which constitute the data field 162 of the data frames 160 at the MAC layer. The header 172 of the data frames 170 includes a sequence number 174 which identifies the data frames by number. A header field 176, which contains an extension bit 176 identified by the letter "E", identifies if the following octet 178 is a length indicator, which as illustrated is identified by the letters "LI", or if the field is payload. The length identifier 178 identifies the type of control information contained in the data frames 170 which may be an announcement or a radio resource control message, such as service related configuration update message. Field 180 contains data which constitutes the MBMC packet 190 which includes an optional header 192 which contains additional information to the peer MBMC entity 110 or 114 e.g. information required for the header compression. Field 194 contains SDUs which are obtained from the MBSC control SDU 196. The MBSC control SDU 196 represents data from the multicast broadcast application 112 or from another source, such as, the core network 108 which provides multicast or broadcast services or a network connected thereto which provides multicast or broadcast services. At radio network controller side this is data, which the radio network controller 106 receives from the lu interface (i.e. it may contain some header which is stripped off in the radio network controller, i.e. this header is always transparent to the mobile stations 104) and in the mobile stations 104 this packet represents the data which is forwarded to the MBMC application 112.

Figure 3:
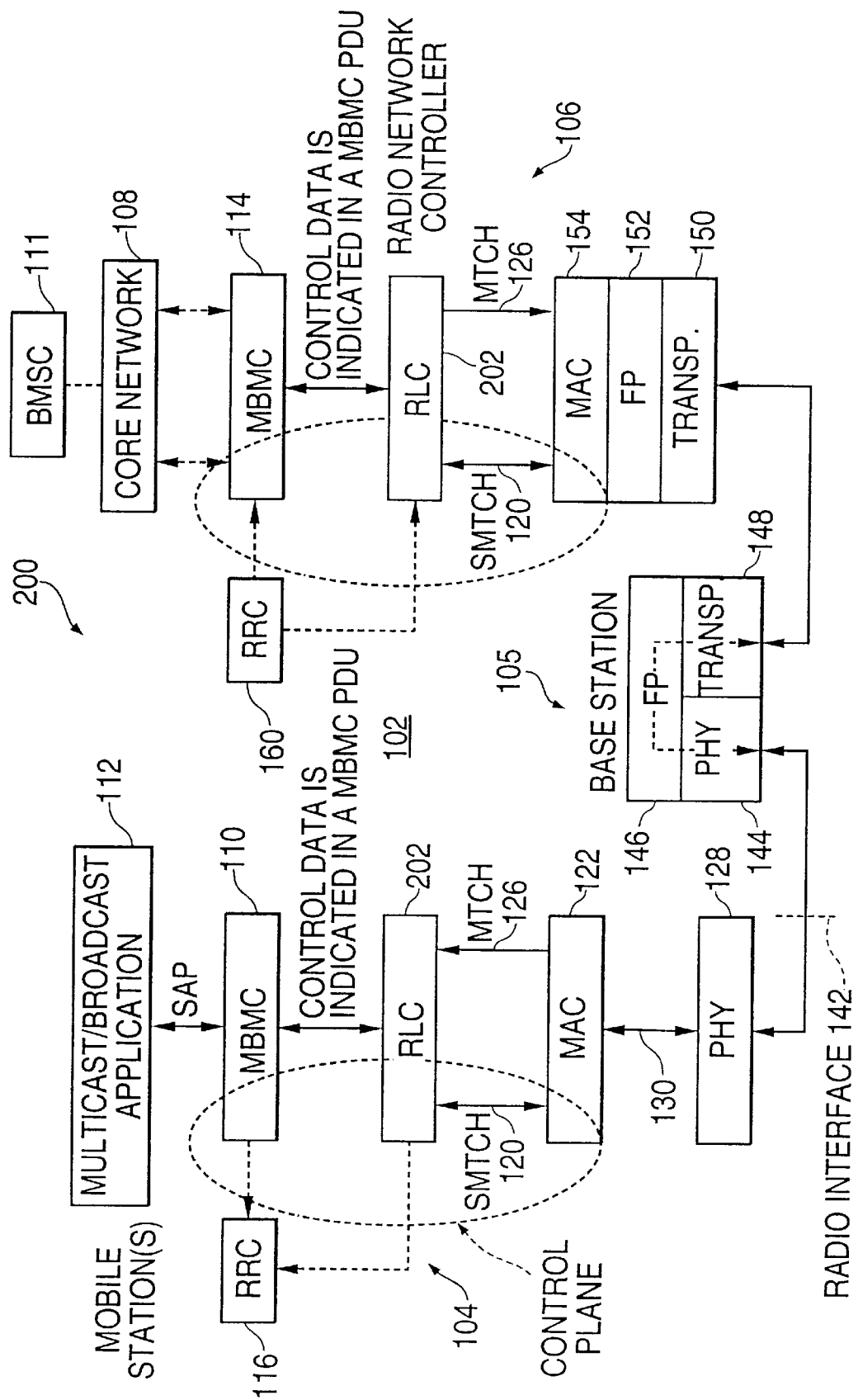
FIG. 3 illustrates a second embodiment of the present invention for separating control information and user data which uses a single RLC entity and two logical channels.

FIG. 3 illustrates a second embodiment 200 in accordance with the invention. The second embodiment differs architecturally from the first embodiment in that only a single RLC entity 202 is used instead of the pair of RLC entities 118 and 124 respectively in the mobile stations 104 and in the controller 106 as with the first embodiment 100. The two logical channels 120 and 122 are utilized and are split at the RLC entities 202.

Figure 4:
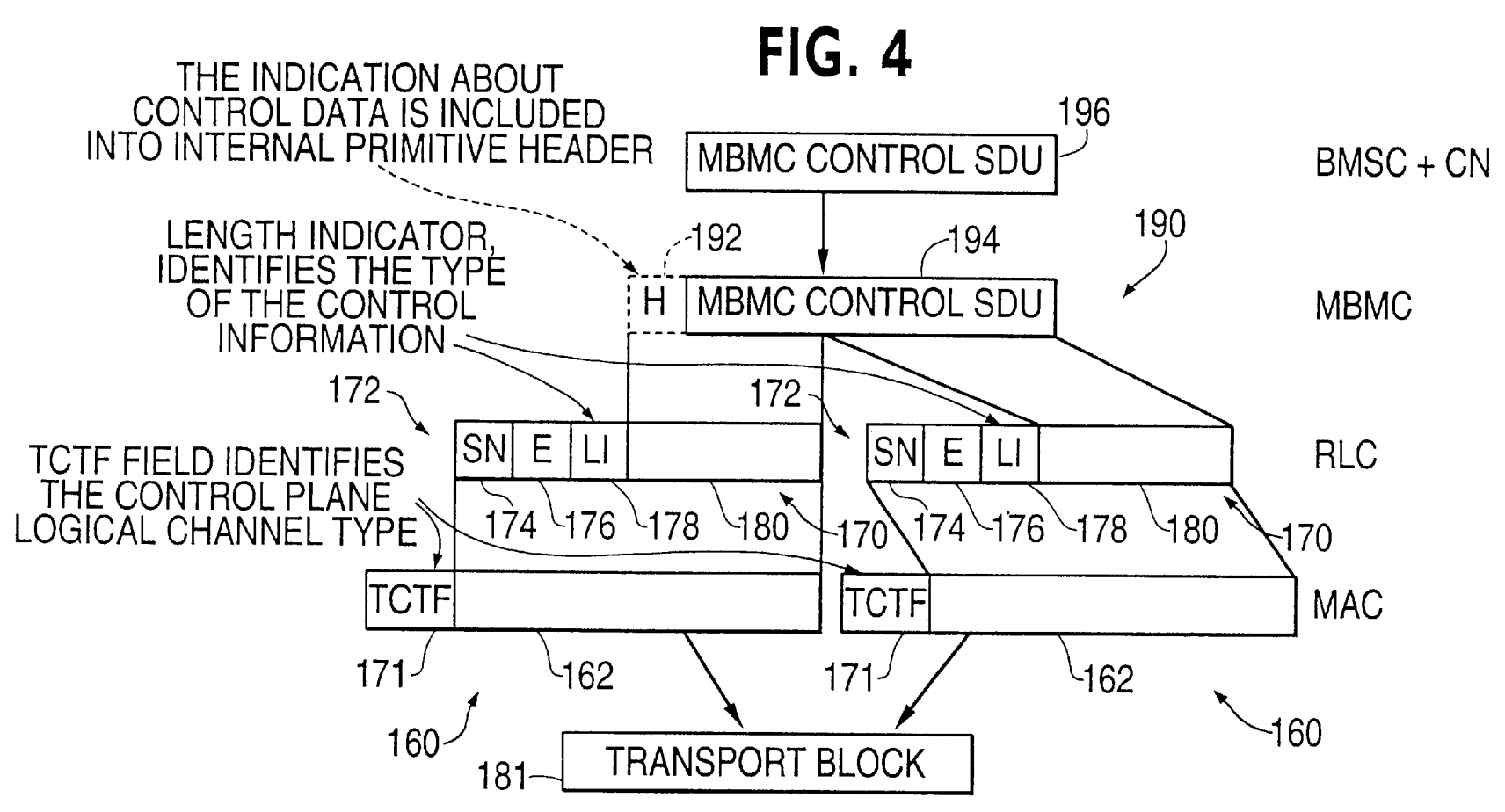

FIG. 4 illustrates the same frame construction of the MAC, RLC and MBMC layers as illustrated in FIG. 2 which is also used with the second embodiment 200.

Figure 5:
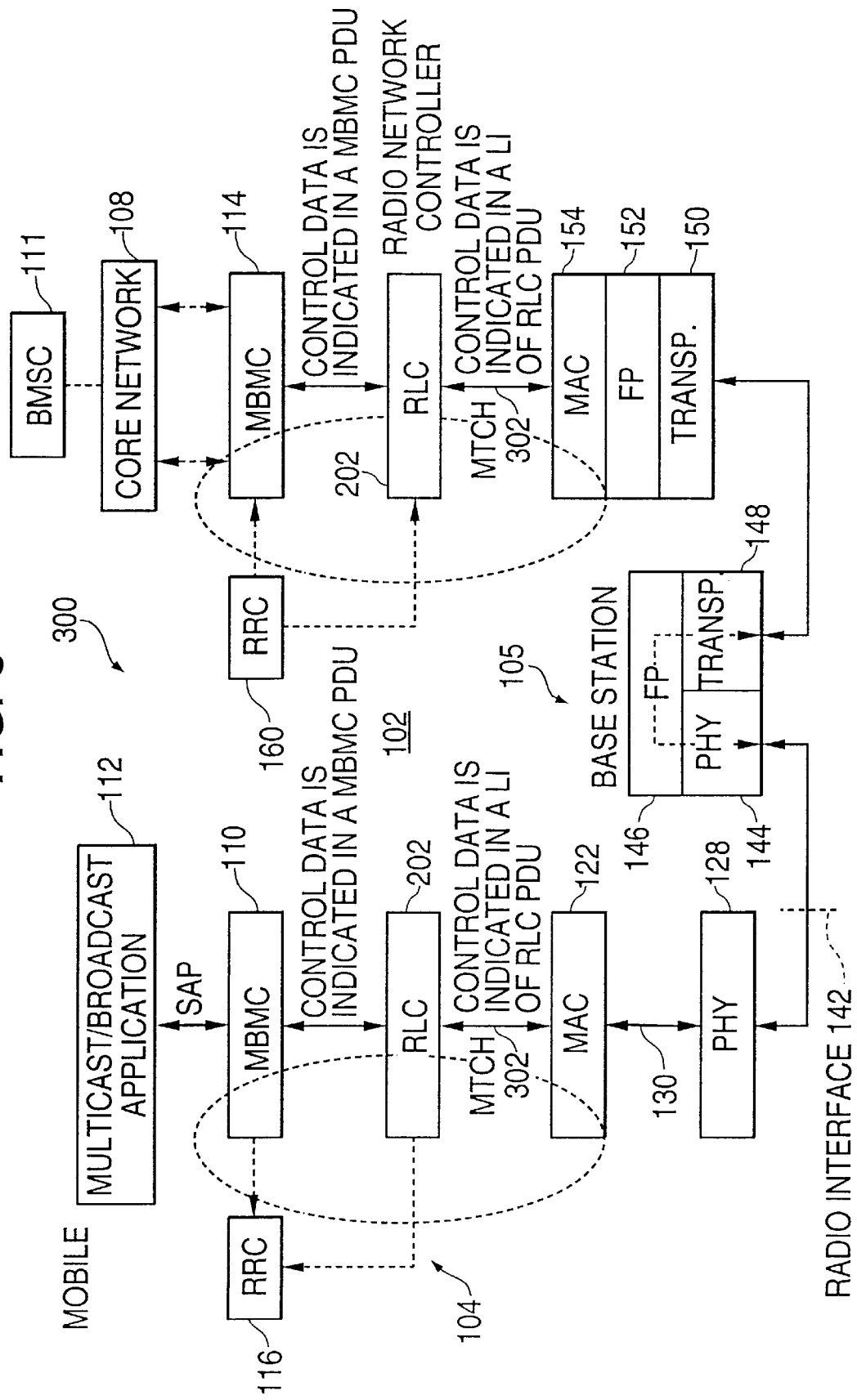
FIG. 5 illustrates a third embodiment of the present invention which separates control information and user data which uses only one logical channel on the MAC, RLC and MBMC network layers.

FIG. 5 illustrates a third embodiment 300 in accordance with the invention. In the third embodiment 300, the control information is identified only on the RLC layer 202. The MAC layers 122 and 154 support only one logical channel. In the logical channel,. the control information is identified in the length identifier as described below in FIG. 6.

Figure 6:
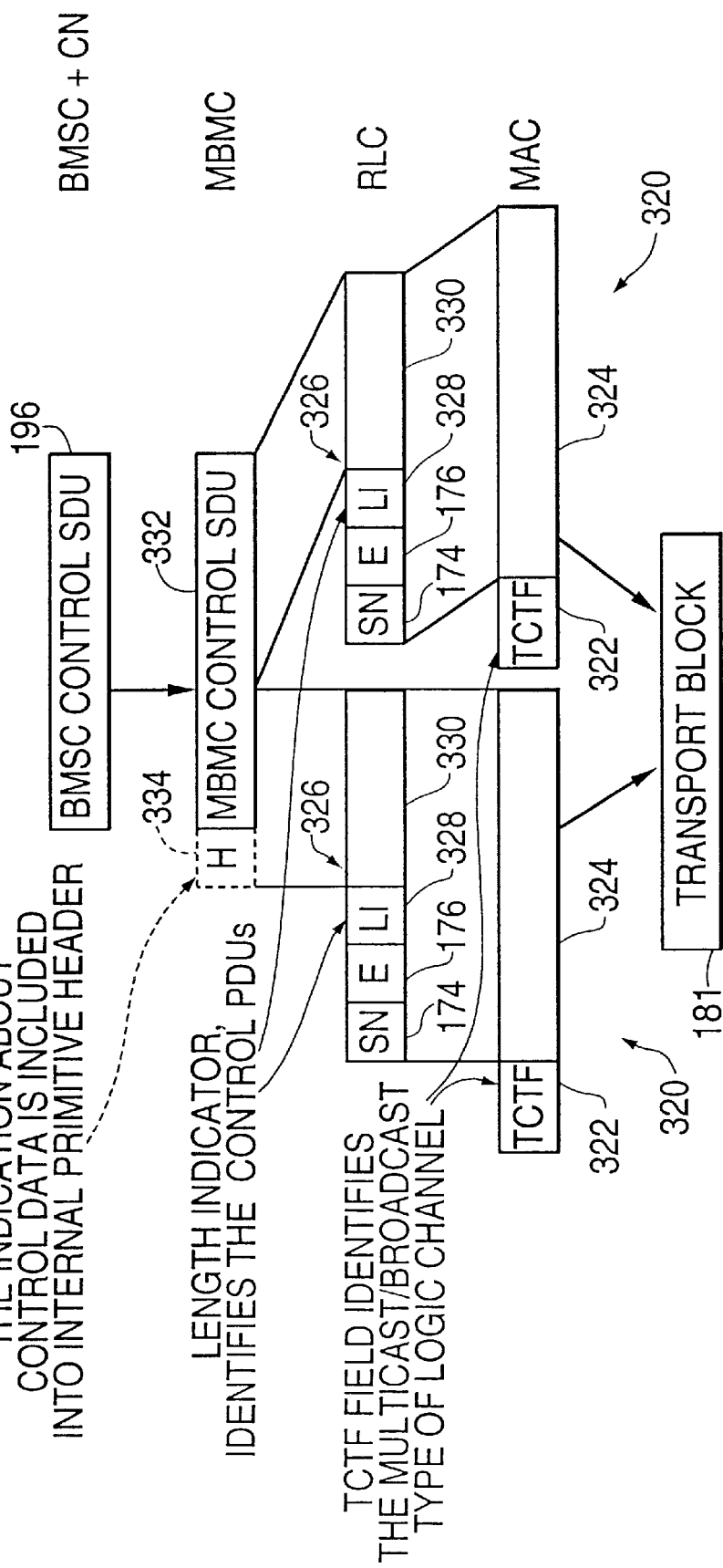
FIG. 6 illustrates the frame construction for the MAC, RLC and MBMC network layers of the third embodiment.

FIG. 6 illustrates the frame construction of the MAC, RLC and MBMC layers of the third embodiment 300 of FIG. 5. The frames 320 include a TCTF header field 322 which identifies the multicast or broadcast type of logical channel. Field 324 contains the data packets 326 of the RLC layer. The length indicator 328 identifies which of the packet data contains control information. Field 330 contains the MBMC data packets 332. The header 334 provides an indication of the type of control data, such as whether an advertisement is included.

While the invention has been described in terms of its preferred embodiments, it is to be understood that numerous modifications may be made without departing from the spirit and scope of the invention. It is intended that all such modifications fall within the scope of the appended claims.

What is claimed is:

1. A method of transmitting control information and user data, relating to multicast or broadcast services, between a first information entity within at least one mobile station and a second information entity within a controller of a wireless network in which the at least one mobile station is located comprising:

originating control information from at least one first information entity;

encoding the control information at the at least one mobile station on a logical channel;

transmitting the logical channel on a physical channel from the at least one mobile station to the controller;

decoding the physical and the logical channels at the controller and providing the control information to the second information entity;

providing user data at the second information entity;

encoding the user data at the controller on a logical channel;

encoding the logical channel, on which the user data is encoded, on a physical channel and wirelessly transmitting the physical channel on which the logical channel is encoded from the controller to the at least one mobile station; and decoding the physical channel and the logical channel on which the user data is encoded at the at least one mobile station and providing the user data to at least one of the first information service entities.

2. A method in accordance with claim 1 comprising:

providing the multicast or broadcast services from another network to the second information entity; and the user data provided at the second information entity is the multicast or broadcast services provided by the another network.

3. A method in accordance with claim 2 wherein the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

4. A method in accordance with claim 2 wherein:

the at least one mobile station and the controller have a protocol stack with a medium access control layer and radio link control layer with the medium access control layer including packets including a field identifying the logical channel on which the control information is encoded and the radio link control layer including packets which a field identifying a type of control information; and the fields are used to process the control information and the user data.

5. A method in accordance with claim 2 wherein:

the logical channel encoding the control information is a first logical channel; and the logical channel encoding the user data is a second logical channel.

6. A method in accordance with claim 5 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

7. A method in accordance with claim 5 wherein:

the logical channel on which the control information is encoded at the at least one mobile station and the logical channel which is decoded at the controller are bi-directional.

8. A method in accordance with claim 7 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

9. A method in accordance with claim 1 wherein:

the logical channel encoding the control information is a first logical channel; and the logical channel encoding the user data is a second logical channel.

10. A method in accordance with claim 9 wherein:

the logical channel on which the control information is encoded at the at least one mobile station and the logical channel which is decoded at the controller are bi-directional.

11. A method in accordance with claim 10 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

12. A method in accordance with claim 9 wherein the at least one mobile station and the controller comprise:

a protocol stack with a medium access control layer and a radio link control layer coupled to the medium access control layer by the logical channels with the logical channel encoding the control information being bi-directional and the logical channel encoding the user data being unidirectional.

13. A method in accordance with claim 12 wherein:

the radio link control layer comprises a single radio link control entity which processes the control information and the user data.

14. A method in accordance with claim 12 wherein:

the radio link control layer comprises first and second radio link control entities which respectively process the control information and the user data.

15. A method in accordance with claim 9 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

16. A method in accordance with claim 1 wherein:

the at least one mobile station and the controller have a protocol stack with a medium access control layer and radio link control layer with the medium access control layer including packets including a field identifying the logical channel on which the control information is encoded and the radio link control layer including packets which a field identifying a type of control information; and the fields are used to process the control information and the user data.

17. A method in accordance with claim 16 wherein:

the radio link control layer comprises first and second radio link control entities which respectively process the control information and the user data.

18. A method in accordance with claim 16 wherein:

the radio link control layer comprises a single radio link control entity which processes the control information and the user data.

19. A method in accordance with claim 16 wherein:

the control information commands the at least one mobile station to periodically repeat an announcement of multicast or broadcast services.

20. A method in accordance with claim 1 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

21. A method in accordance with claim 1 wherein the at least one mobile station and the controller comprise:

a protocol stack with a network control layer, a medium access control layer coupled to the network control layer by a single logical channel and a radio link control layer coupled to the medium access control layer by a single logical channel; and wherein the medium access control layer uses packets including a field identifying a type of logical channel containing the packets of the medium access control layer, the radio link control layer uses packets including a field identifying control packets within the single channel and the network control layer uses packets including a field identifying a type of control information in the identified control packets; and wherein the fields are used to process the control information and the user data.

22. A method in accordance with claim 1 comprising:

a first radio resource control entity, coupled to one of the first information service entities and to a radio link control layer of the at least one mobile station, which receives the control information from either the first information entity or to the radio link control layer of the one the at least one mobile station entity; and a second radio resource control entity, coupled to the second information entity and to a radio link control layer of the controller, which transmits the control information to either the second information entity or to the radio link control layer of the controller.

23. A method in accordance with claim 1 wherein:

the control information comprises multicast joining messages or broadcast service messages.

24. A method in accordance with claim 1 wherein:

the control information comprises announcements of multicast or broadcast services to be offered.

25. A method in accordance with claim 1 wherein: the control information comprises broadcast subscription messages. periodically repeat an announcement of multicast or broadcast services.

26. A system which transmits control information and user data comprising:

a wireless network including mobile stations and a controller;

a first information entity in each mobile station; and a second information entity in the controller; and wherein
at least one first information entity originates control information;
the originated control information is encoded by at least one mobile station on a logical channel;
the at least one mobile station transmits to the controller the logical channel encoded on a physical channel;
the controller decodes the physical and logical channels and provides the control information to the second information entity;
user data is provided at the second information entity;
the user data is encoded at the controller on a logical channel;
the logical channel on which the user data is encoded is encoded on a physical channel and wirelessly transmitted with the physical channel on which the logical channel is encoded from the controller to the at least one mobile station; and
the at least one mobile station decodes the physical channel and the logical channel on which the user data is encoded and provides the user data to at least one of the first information service entities.

27. A system in accordance with claim 26 comprising:

providing the multicast or broadcast services from another network to the second information entity; and the user data provided at the second information entity is the multicast or broadcast services provided by the another network.

28. A system in accordance with claim 27 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

29. A system in accordance with claim 27 wherein:

the at least one mobile station and the controller have a protocol stack with a medium access control layer and radio link control layer with the medium access control layer including packets including a field identifying the logical channel on which the control information is encoded and the radio link control layer including packets which a field identifying a type of control information; and the fields are used to process the control information and the user data.

30. A system in accordance with claim 27 wherein:

the logical channel encoding the control information is a first logical channel; and the logical channel encoding the user data is a second logical channel.

31. A system in accordance with claim 30 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

32. A system in accordance with claim 30 wherein:

the logical channel on which the control information is encoded at the at least one mobile station and the logical channel which is decoded at the controller are bi-directional.

33. A system in accordance with claim 32 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

34. A system in accordance with claim 26 wherein:

the logical channel encoding the control information is a first logical channel; and the logical channel encoding the user data is a second logical channel.

35. A system in accordance with claim 34 wherein:

the logical channel on which the control information is encoded at the at least one mobile station and the logical channel which is decoded at the controller are bi-directional.

36. A system in accordance with claim 35 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

37. A system in accordance with claim 34 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

38. A system in accordance with claim 34 wherein the at least one mobile station and the controller comprises:

a protocol stack with a medium access control layer and a radio link control layer coupled to the medium access control layer by the logical channels with the logical channel encoding the control information being bi-directional and the logical channel encoding the user data being unidirectional.

39. A method in accordance with claim 38 wherein:

the radio link control layer comprises a single radio link control entity which processes the control information and the user data.

40. A method in accordance with claim 38 wherein:

the radio link control layer comprises first and second radio link control entities which respectively process the control information and the user data.

41. A system in accordance with claim 26 wherein:

the at least one mobile station and the controller have a protocol stack with a medium access control layer and radio link control layer with the medium access control layer including packets including a field identifying the logical channel on which the control information is encoded and the radio link control layer including packets which a field identifying a type of control information; and the fields are used to process the control information and the user data.

42. A method in accordance with claim 41 wherein:

the radio link control layer comprises a single radio link control entity which processes the control information and the user data.

43. A system in accordance with claim 41 wherein:

the radio link control layer comprises first and second radio link control entities which respectively process the control information and the user data.

44. A method in accordance with claim 41 wherein:

the control information commands the at least one mobile station to periodically repeat an announcement of multicast or broadcast services.

45. A system in accordance with claim 26 wherein:

the at least one mobile station and the controller have a protocol stack with a medium access control layer and radio link control layer with the medium access control layer using packets including a field identifying a type of logical channel containing the packets of the medium access control layer and the radio link control layer using packets including a field identifying a type of control information contained in packets of the radio link layer; and the fields are used to process the control information and the user data.

46. A system in accordance with claim 26 wherein the at least one mobile station and the controller comprise:

a protocol stack with a network control layer, a medium access control layer coupled to the network control layer by a single logical channel and a radio link control layer coupled to the medium access control layer by a single logical channel; and wherein the medium access control layer uses packets including a field identifying a type of logical channel containing the packets of the medium access control layer, the radio link control layer uses packets including a field identifying control packets within the single channel and the network control layer uses packets including a field identifying a type of control information in the identified control packets; and wherein the fields are used to process the control information and the user data.

47. A system in accordance with claim 26 comprising:

a first radio resource control entity, coupled to one of the first information service entities and to a radio link control layer of the at least one mobile station, which receives the control information from either the first information entity or to the radio link control layer of the one the at least one mobile station entity; and a second radio resource control entity, coupled to the second information entity and to a radio link control layer of the controller, which transmits the control information to either the second information entity or to the radio link control layer of the controller.

48. A system in accordance with claim 26 wherein:

the control information comprises multicast joining messages.

49. A system in accordance with claim 26 wherein:

the control information comprises announcements of multicast or broadcast services to be offered.

50. A system in accordance with claim 26 wherein:

the control information comprises broadcast subscription messages.

* * * * *